United States Patent [19]

Serita et al.

[11] Patent Number: 4,725,660

[45] Date of Patent: Feb. 16, 1988

[54] METHOD FOR PRODUCING POLYSILAZANE

[75] Inventors: Tamio Serita, Chibashi; Hiroyuki Takeuchi, Minamatashi, both of Japan

[73] Assignee: Chisso Corporation, Osaka, Japan

[21] Appl. No.: 868,039

[22] Filed: May 29, 1986

[30] Foreign Application Priority Data

Jun. 17, 1985 [JP] Japan .................................. 60-131070

[51] Int. Cl.$^4$ .............................................. C08G 77/04
[52] U.S. Cl. ........................................ 528/28; 528/38; 556/412
[58] Field of Search ...................... 528/28, 38; 556/412

[56] References Cited

U.S. PATENT DOCUMENTS

| | | | |
|---|---|---|---|
| 3,098,830 | 7/1963 | Rochow | 528/28 |
| 3,311,571 | 3/1967 | Burks, Jr. et al. | 528/28 |
| 3,354,098 | 11/1967 | Byrd | 528/28 |

*Primary Examiner*—Melvyn I. Marquis
*Attorney, Agent, or Firm*—Fred Philpitt

[57] ABSTRACT

A method which comprises reacting an aminosilane compound with an excessive amount of ammonia or primary amine under conditions which produce a polysilazane.

9 Claims, No Drawings

METHOD FOR PRODUCING POLYSILAZANE

BACKGROUND OF THE INVENTION

1. Field of the Invention

This invention relates to a method for producing polysilazane which can be a precursor for silicon nitride dominating ceramics.

2. Description of the Prior Art

Since a so-called precursor method in which heat-resisting ceramics are produced by pyrolysis of organometallic polymers, has the advantages such as capability of forming products of special shapes which have not been obtained through conventional processings of ceramics powder, easy attainment of products having purity higher than those obtained through conventional processes, capability of being processed at a lower temperature or the like, research works thereof are becoming active. As one of them, there is a method in which polycarbosilazanes are subjected to pyrolysis to obtain ceramics containing, as its principal component, silicon nitride. For example, in the publication of Japanese examined patent application No. 46995 of 1980 (as well as in FR. No. 2,190,764, U.S. Pat. No. 3,853,567 and DE No. 2,218,960), there is described a methord in which tris(methylamino)methylsilane which is obtained by causing methyltrichlorosilane to react with methylamine, is subjected to heat treatment at about 520° C. to obtain polycarbosilazane. Resultant polycarbosilazane is subjected to pyrolysis to obtain ceramics. However, in case of the abovementioned method, since there are a large amount of organic residual groups included in the formed polymer, the loss during pyrolysis is so large as about 35~45% and since a considerable amount of carbon is remaining in ultimate ceramics, (content of $Si_3N$ is about 50%), it is not a preferable material as a precursor polymer for obtaining a high purity silicon nitride. Further, a higher temperature necessary for obtaining a polymer such as 520° C. is not preferable from the view point of energy-cost.

SUMMARY OF THE INVENTION

In view of the present status as abovementioned, we, the inventors of the present invention has investigated how to obtain a precursor polymer containing only a small amount of organic residual group in the polymer, hence a precursor polymer having such a small amount of organic residual group as being capable of providing ceramics of a lower carbon content and a higher silicon nitride content after pyrolysis, can be obtained, at a relatively lower temperature, with a higher yield of ceramics, and as a result of the investigation, have come to the present invention.

The present invention resides in a method for producing a polysilazane which is characterized in reacting an aminosilane compound represented by a general formula (I)

$R_n^1 Si(NR^2R^3)_{4-n}$ (wherein $R^1$ and $R^2$ indicate hydrogen atom or an alkyl group having 1~4 carbon atoms and $R^3$ indicates an alkyl group having 1~4 carbon atoms and n is 0, 1 or 2), having been obtained by reacting a chlorosilane and an amine, with an excessive amount of ammonia or a primary amine represented by a general formula (II) $R^4NH_2$ (wherein $R^4$ is an alkyl group containing a smaller number of carbon atoms than either of $R^2$ of $R^3$); and driving off the generated organic amine to the outside of the reaction system to effect polymerization.

As a chlorosilane, one of the raw materials used in the production of the compound of the formula (I), chlorosilanes such as $SiCl_4$, $HSiCl_3$, $H_2SiCl_2$, etc. and alkylchlorosilanes such as $CH_3SiCl_3$, $(CH_3)_2SiCl_2$, $CH_3HSiCl_2$ etc. can be mentioned. These can be used as a single material or in a mixture but from the point of increasing yield of ceramics, chlorosilanes which do not contain alkyl group are preferable.

As an amine; the other raw material, primary amines such as $CH_3NH_2$, $C_2H_5NH_2$, n-$C_3H_7NH_2$, n-$C_4H_9NH_2$, tert-$C_4H_9NH_4$, etc and secondary amines such as $(CH_3)_2NH$, $(C_2H_5)_2NH$, $CH_3C_2H_5NH$, (n-$C_3H_7)_2NH$, etc. can be used, and they can be used also as a single material or a mixture.

The reaction of a chlorosilane with an amine proceeds even without an solvent but is carried out preferably in an organic solvent because of separation operation of a by-product salt. As an organic solvent, those which do not have interaction with reactants and formed aminosilane and which can dissolve the reactants and the formed aminosilanes, can be used but it is preferable to select a solvent having a boiling point which makes reaction proceed easily, depending upon the raw material used. For example, $CH_2Cl_2$ (bp; 40° C.), $CH_2Cl.CH_2Cl$ (bp; 83° C.), toluene (bp; 111° C.), are preferably used.

When chlorosilane is gradually added during the course of reaction to a solution in which an excessive amount of amine is present, formed hydrogen chloride reacts with the excessive amine to give an amine hydrochloride. Since this material is insoluble in a solvent, it can be easily separated. The reaction formula can be illustrated as follows;

EXAMPLE 1

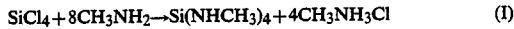

$SiCl_4 + 8CH_3NH_2 \rightarrow Si(NHCH_3)_4 + 4CH_3NH_3Cl$     (I)

EXAMPLE 2

$H_2SiCl_2 + 4(CH_3)_2NH \rightarrow H_2Si[N(CH_3)_2]_2 + 2(CH_3)_2NH_2Cl$     (I)

If an amine hydrochloride is present in the formed aminosilane, it promotes undesirable crosslinking reaction in the next polymerization step to form polymers which is troublesome in handling. Accordingly, it is necessary to get rid of the salt by separation as much as possible. It is possible to separate the salt almost completely by filtering the solvent after completion of the reaction but there is a case in which a small amount of the salt is dissolved depending upon the solvent used. In such a case, the solvent should be changed to the one which does not dissolve the salt and refiltration is carried out. When the reaction liquid from which the salt is removed, is evaporated under vacuum, an amonosilane compound is obtained, but purification is carried out further if necessary by using a commonly known procedure such as recrystallization vacuum distillation or the like.

Further description will be made about the step of the kernel of the production method of the present invention i.e. reaction of the aminosilane compound of the formula (1) obtained as abovementioned with ammonia or a volatile amine carried out to polymerize the aminosilane compound. It is generally known that amino-exchange reaction occurs when amino is worked on an aminosilane compound but it has been considered to proceed only in a case where a volatile amine is driven off by using a lower volatile amine and in such a case it is considered that forming of a higher molecule does not occur by way of condensation due to entering of more sterically bulky group (cf. R. Fessenden et al. Chem, Rev. 61, 361-384 (1961)).

We, the inventors of the present invention have discovered that if ammonia or a volatile amine is caused to react in an excessive amount, the exchange reaction becomes operable and by leading the formed low-volatile amine to outsides the system, this exchange reaction proceeds smoothly, further condensation reaction occurs and polymers are formed. It is inferred that this is brought about by the fact that the aminosilane compound produced by the exchange reaction is unstable and immediately polymerized by condensation.

(EXAMPLE 1)

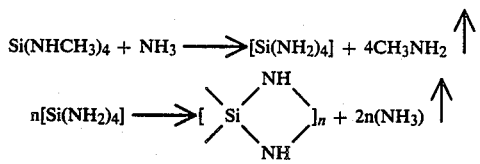

(EXAMPLE 2)

$H_2Si[N(CH_3)_2]_2 + CH_3NH_2 \longrightarrow$

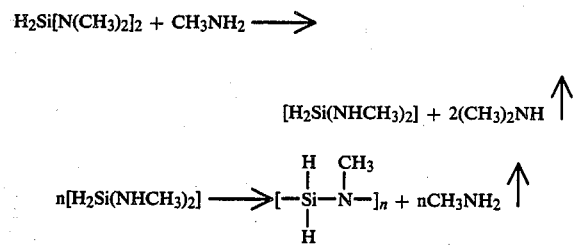

This exchange reaction with ammonia or amine can be carried out in the presence of or absence of a solvent but which of the two is preferable to the other, varies depending upon aminosilane compound. For example, in case of the aminosilane of the abovementioned formula (Example 2), it reacts well with ammonia in a toluene solution, but in case of the compound of the abovementioned formula (Example 1), the reaction with ammonia scarcely proceeds in a toluene solution, and when ammonia is introduced into aminosilane heated at about 50° C. in the absence of a solvent, the reaction proceeds to produce a polymer. Resulting polymer is freed of a solvent at first in case of the use of a solvent and if necessary, purification is carried out further by a procedure such as reprecipitation or the like. The ammonia or amine generated in the amine interchange reaction and the condensation reaction which follows this reaction is recovered if necessary, by a known procedure.

According to the method for producing polysilazane of the present invention as abovementioned, following advantages can be attained.

(1) A polymer precursor having a lower carbon content, a high content of silicon nitride and higher ceramics yield can be obtained.

(2) Since the polymerization can be carried out at a lower temperature, a side reaction is few and energy-saving can be realized.

PREFERRED EMBODIMENT OF THE INVENTION

The method of the present invention will be further described more fully by way of following specific examples.

EXAMPLE 1

A 0.5 l, three-necked flask was equipped with a condenser, a stirrer and an inlet for gas feeding and the inside of the system of this flask was replaced with dry nitrogen gas. To this, 200 ml of $CH_2Cl_2$, as a solvent, was charged. After cooled to $-5°$ C. with an ice-salt bath, 36.4 g (1.17 mol) of $CH_3NH_2$ was dissolved. With stirring, a solution of 20 g (0.117 mol) of $SiCl_4$ dissolved in 20 ml of $CH_2Cl_2$ was added slowly over a period of 30 minutes and after addition, the reaction liquid was heated upto room temperature and stirring was continued further for one hour. Separated salt of amine hydrochloride was filtered off under a nitrogen seal, and the solvent was distilled off by a rotary evaporator to give 13.3 g of product (yield 77%). The amount of separated amine hydrochloride salt by filtration was 30.3 g which corresponded to the reaction rate (proportion) of 96% or more. When the product was distilled in vacuo at 45 mmHg, it showed boiling point of 90° C. and melting point of 37° C. The characteristic absorption of infrared absorption spectra coincided to the structure of $Si(NHCH_3)_4$ as follows. 3410 $cm^{-1}$ (NH stretching) 2870 $cm^{-1}$ 2800 $cm^{-1}$ (CH stretching), 1370 $cm^{-1}$, 1100 $cm^{-1}$, and 810 $cm^{-1}$.

0.88 g (6 m mol) of aminosilane compound thus obtained was taken into a test tube, caused to melt by heating at 50° C. When $NH_3$ gas dried by passing through a KOH-filled column, was passed through the melted liquid at a flow rate of 4 ml/min and room temperature, a viscous solid was obtained after 1.5 hours. The melting point was 200° C. or more. When the infrared absorption spectra of this material was measured the absorption of 3430 $cm^{-1}$ (NH) was notable but the absorption of CH was disappeared and the forming of a polymer having a unit structure of

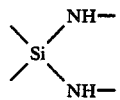

was confirmed.

When this silazane polymer was heated upto a temperature of 1100° C. at a rate of rise of temperature of 200° C./hr in the atmosphere of nitrogen and then baked further for one hour, whereby a black ceramics solid could be obtained. Yield was 72.5%. Carbon content by way of elemental analysis was 15.8%.

EXAMPLE 2

A system comprising a 0.5 l three-necked flask equipped with a condenser, a stirrer and a gas inlet was thoroughly flushed with dry nitrogen gas. To this, 200 ml of $CH_2Cl_2$ as a solvent was introduced. 86 g of $(CH_3)_2NH$ (1.9 mol) was dissolved and cooled to $-20°$ C. A solution of 40 g (0.4 mol) of $H_2SiCl_2$ in $CHCl_2$ was slowly added over a period of 1.5 hour. Thereafter, temperature was elevated upto room temperature and further stirring was continued for 1 hour. After filtration of precipitated amine hydrochloride, 100 ml of n-pentane was added, precipitated salt was filtered again and filtrate was freed of solvent by distilling off by a rotary evaporator to give liquid aminosilane compound. This material was subjected to atmospheric distillation and distillate fraction of the boiling points in the range of 91°~92° C. was collected (yield 32%). From the characteristic absorption of infra-red absorption of this material i.e. 2950 cm$^{-1}$, 2860 cm$^{-1}$, 2780 cm$^{-1}$ (CH$_3$ stretching), 2100 cm$^{-1}$ (Si—H, stretching), 1480 cm$^{-1}$, 1440 cm$^{-1}$ (C—H antisymmetry), 1290 cm$^{-1}$ (C—H symmetry) 1180 cm$^{-1}$, 990 cm$^{-1}$ (N—Si—N skeletone), the structure of H$_2$Si (N(CH$_3$)$_2$)$_2$ was confirmed.

This aminosilane in an amount of 0.44 g (3.7 m mol) was introduced in a test tube in the form of 10% toluene solution and NH$_3$ gas was passed through at a flow rate of 4 ml/min. at room temperature. After 75 minutes, vanishment of aminosilane was confirmed by gas chromatography. When toluene was distilled off, 0.15 g of viscous liquid was obtained. Since 3380 cm$^{-1}$ (N—H) appeared and absorption of CH$_3$ disappeared in the infrared absorption spectra, it was confirmed that the forming of a polymer having a structure unit of

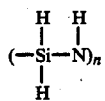

was confirmed. When this silazane polymer was baked at 1100° C. in nitrogen, a black solid ceramics having a carbon content of 11.9% was obtained with a yield of 79%.

COMPARATIVE EXAMPLE

The aminosilane compound obtained in the first half step of Example 1 was subjected to a thermal polymerization in the following way. An aminosilane compound in an amount of 1.5 g was introduced in a 50 ml eggplant-shaped flask and heated by an oil bath under a water-cooled condenser and with nitrogen seal. When heated to 190° C., boiling and refluxing started. After 5 hours, in accordance with reduction of reflux, the system was brought to reduced pressure state whereby the system was gradually turned to viscous state and one hour after reaching a reduced pressure of 3 mmHg, heating was stopped and 0.7 g of white solid polymer was obtained upon cooling down. This material had a melting point of about 100° C. From the characteristic absorption of the following infla-red absorption spectra, the formation of silazane polymer was confirmed: 2920 cm$^{-1}$, 2870 cm$^{-1}$, 1050 cm$^{-1}$ (all are C—H stretching), 1370 cm$^{-1}$, 1200 cm$^{-1}$, 1100 cm$^{-1}$, 1050 cm$^{-1}$ 950 cm$^{-1}$, 865 cm$^{-1}$. However, the carbon content of the black ceramics obtained (yield 58%) by baking this material at 100° C. in N$_2$ was as large as 27.8%.

What is claimed is:

1. The method which comprises reacting an aminosilane compound with an excessive amount of ammonia or a primary amine under conditions which produce a polysilazane and wherein
   (a) said aminosilane compound has the formula R$^1_n$Si(NR$^2$R$^3$)$_{4-n}$ wherein R$^1$ and R$^2$ are hydrogen or an alkyl group having 1-4 carbon atoms, R$^3$ is an alkyl group having 1-4 carbon atoms, and n is 0, 1 or 2,
   (b) said primary amine has the formula R$^4$NH$_2$ wherein R$^4$ is an alkyl group containing a smaller number of carbon atoms than either R$_2$ or R$_3$, and
   (c) the by-product organic amine produced by the reaction of said aminosilane and said ammonia or primary amine is removed from the produced polysilazane.

2. The method of claim 1 wherein said aminosilane is the reaction product of a chlorosilane and an amine.

3. The method according to claim 1 wherein said aminosilane is only reacted with ammonia.

4. A method according to claim 1 wherein said reaction is carried out in the absence of solvent.

5. A method according to claim 1 wherein said reaction is carried out in a solvent.

6. A method according to claim 1 wherein said reaction is carried out in toluene.

7. A method according to claim 1 wherein said aminosilane compound is Si(NHCH$_3$)$_4$ and is treated with ammonia in the absence of a solvent to produce a polysilazane having a unit structure of

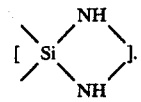

8. A method according to claim 1 wherein said aminosilane compound is H$_2$Si[N(CH$_3$)$_2$]$_2$ and is treated with ammonia in the presence of toluene to produce a polysilaxane having a unit structure of

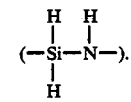

9. A method according to claim 1 wherein said aminosilane is H$_2$Si[N(CH$_3$)$_2$]$_2$ and is treated with CH$_3$NH$_2$ to produce a polysilaxane having a unit structure of

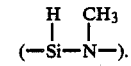

* * * * *

UNITED STATES PATENT AND TRADEMARK OFFICE
CERTIFICATE OF CORRECTION

PATENT NO. : 4,725,660

DATED : February 16, 1988

INVENTOR(S) : SERITA et al

It is certified that error appears in the above-identified patent and that said Letters Patent is hereby corrected as shown below:

column 2, line 37 error: $SiCl_4 + 8CH_3NH_2 \rightarrow Si(NHCH_3)_4 + 4CH_3NH_3Cl$ (I)

Correct: $SiCl_4 + 8CH_3NH_2 \rightarrow Si(NHCH_3)_4 + 4CH_3NH_3Cl$
(I)

UNITED STATES PATENT AND TRADEMARK OFFICE
CERTIFICATE OF CORRECTION

PATENT NO. : 4,725,660

DATED : February 16, 1988

INVENTOR(S) : SERITA et al

It is certified that error appears in the above-identified patent and that said Letters Patent is hereby corrected as shown below:

column 2, line 42 error: $H_2SiCl_2 + 4(CH_3)_2NH \rightarrow H_2Si[N(CH_3)_2]_2 + 2(CH_3)_2NH_2Cl$  (I)

Correct: $H_2SiCl_2 + 4(CH_3)_2NH \rightarrow H_2Si[N(CH_3)_2]_2 + 2(CH_3)_2NH_2Cl$  (I)

Signed and Sealed this

Second Day of June, 1992

*Attest:*

DOUGLAS B. COMER

*Attesting Officer*   *Acting Commissioner of Patents and Trademarks*